United States Patent [19]

Sarma

[11] Patent Number: 5,559,063
[45] Date of Patent: Sep. 24, 1996

[54] REFRACTORY MATERIAL

[75] Inventor: Atul C. Sarma, Louisville, Ky.

[73] Assignee: Whip Mix Corporation, Louisville, Ky.

[21] Appl. No.: 501,323

[22] Filed: Jul. 12, 1995

[51] Int. Cl.$^6$ .......................... C04B 35/48; C04B 35/49; C04B 35/04; B28B 7/28

[52] U.S. Cl. .......................... 501/104; 501/103; 501/111; 501/117; 501/118; 501/106; 106/383; 106/35

[58] Field of Search ...................... 501/103, 104, 501/111, 106, 117, 118; 106/38.3, 35

[56] References Cited

U.S. PATENT DOCUMENTS

| | | | |
|---|---|---|---|
| 3,192,583 | 7/1965 | Fryrear, Jr. | 164/34 |
| 3,526,485 | 9/1970 | Dawihl et al. | 501/103 |
| 3,647,488 | 3/1972 | Brigham et al. | 501/111 |
| 3,649,732 | 3/1972 | Brigham et al. | 264/16 |
| 3,663,141 | 5/1972 | Alain et al. | 425/125 |
| 4,222,782 | 9/1980 | Alliegro et al. | 501/117 |
| 4,602,667 | 7/1986 | Moore et al. | 106/38.3 |
| 4,844,148 | 7/1989 | Cuisin et al. | 106/38.3 |
| 4,909,847 | 3/1990 | Ohi et al. | 106/38.35 |
| 5,055,047 | 10/1991 | Names | 433/214 |
| 5,180,427 | 1/1993 | Prasad et al. | 106/35 |
| 5,232,365 | 8/1993 | Ikehara | 433/213 |
| 5,234,343 | 8/1993 | Shoher et al. | 433/215 |
| 5,236,495 | 8/1993 | Manabe et al. | 501/45 |
| 5,308,391 | 5/1994 | Komma et al. | 501/59 |

*Primary Examiner*—Mark L. Bell
*Assistant Examiner*—Louis M. Troilo
*Attorney, Agent, or Firm*—Wheat, Camoriano, Smith & Beres, PLC

[57] ABSTRACT

A refractory powder includes a filler, a binder, and a metal powder. This provides improved heat transfer in the refractory material during heating, and reduces the problem of explosive cracking and spalling so the refractory material can be burned out at substantially constant temperature, thereby saving considerable amounts of time and energy.

10 Claims, No Drawings

REFRACTORY MATERIAL

FIELD OF INVENTION

The present invention relates to refractory materials, including investment materials and refractory die materials. A primary use for these materials is in the field of dental restoration work, although they are also used for other purposes.

BACKGROUND OF THE INVENTION

Dental restoration materials, such as crowns, are commonly prepared through a precision casting technique. After an impression is made of a patient's teeth, the impression is sent to a laboratory where an exact wax replica is made of the tooth or portion of a tooth in need of replacement. The metal portion of the crown is formed by a lost wax process in which a mold is formed around the wax tooth replica, the wax is melted out, and the mold is then used to cast a replacement tooth.

First, the wax tooth replica is sprued and placed in a metal ring or removable plastic ring. An investment powder, made up of a binding system and a filler system, as well as some other chemicals, is then mixed with colloidal silica liquid to produce a slurry. This slurry is then poured into the ring and is allowed to set for one to two hours until it hardens into a mold, surrounding the wax tooth replica. (The slurry may alternatively be poured into an impression for forming a refractory die.) The mold is then placed in a furnace, and the furnace temperature is raised to 650° C. or higher. This heating process is often referred to as burning-out the mold. During burn-out, the mold is subjected to high heat to melt the wax/plastic pattern and to complete the pyrolytic reactions.

After the wax pattern melts away, a hollow cavity is left. A molten metal, typically a precious or nonprecious metal alloy, is then poured into the cavity and allowed to cool. After the metal casting is removed from the impression, dental porcelains or alloy materials may then be sintered onto the crown or other dental restoration device for aesthetic effect to complete the process.

As was previously mentioned, the refractory powders used in this process contain a filler system and a binder system; some also contain small amounts of chemicals and wetting agents to regulate various desired properties of the system. A typical filler system may include one or more silica allotropes, such as quartz, tridymite, or cristobalite, in combination with various metallic oxides, such as aluminum oxide, calcium or aluminum silicates, and other materials, including zircon, zirconia, leucite, calcium fluoride, and pyrophylites. Normally, the filler system comprises 50 to 80 weight percent of the refractory powder. The binding system usually is made up of one or more different ammonium phosphate compounds, such as monobasic, dibasic, or hemibasic ammonium phosphate, and magnesium oxide. Normally, the binder system comprises 20 to 50 weight percent of the refractory powder. The powder is mixed with a colloidal silica liquid to produce the slurry, whereupon the lost wax process is performed.

A problem encountered during the lost wax process is the breaking or cracking of the mold during the heating process. Explosive cracking may occur shortly after the mold is placed in a preheated furnace, typically during the first fifteen minutes. If explosive cracking occurs, the entire process must be conducted again from the beginning, at great cost. Even if explosive cracking does not occur, the mold material may fall off in chunks, or may spall, again resulting in a useless product. Micro-cracking, which may or may not result in a useless product but often yields a substandard one, may occur as the mold is heated above 750° C.

Explosive cracking and spalling occur because of two concurrent problems. First, the binder system is decomposing at lower temperatures, thereby releasing the more volatile contents such as water and ammonia, causing a contraction of the system. Second, an uneven expansion of the system is caused by the temperature differential across the mold as it is heated, since the outer edges of the mold are at a higher temperature than the inner part of the mold. This occurs because the filler and binder ingredients contained in refractory powder materials are poor conductors of heat, especially at temperatures below 500° C.

Therefore, in the prior art, refractory materials must be introduced into a furnace at very low temperatures, and the rate of heat increase must be kept low to avoid exploding the mold during the heating process. It is then necessary to cool the furnace down to room temperature before the next batch of molds can be introduced into the furnace.

In a typical process, in order to avoid explosive cracking, the mold is placed in a furnace at room temperature and is then gradually heated until a designated maximum temperature is reached, which usually takes from one to two hours, with an additional thirty minute holding period to allow the mold to soak in the heat. Thus, it takes approximately three hours for the furnace to complete the process of heating up and cooling down to make a single batch of products. This is very time-consuming and wastes a lot of energy, because all the energy used to heat the furnace is lost before the next batch can be put into the furnace. The repeated heating and cooling of the furnace also diminishes the furnace life, as it expands and contracts with each heating and cooling.

SUMMARY OF THE INVENTION

Because of the foregoing problems, the present inventors have conducted extensive research into the problems of explosive cracking and spalling in order to improve the efficiency of the lost wax process.

The present invention provides a refractory material which resists cracking or spalling when heated rapidly.

The present invention also provides a refractory material which can be placed directly into a hot furnace. Since gradual heating is not necessary, the process can be completed in forty minutes, as compared with two to three hours in the prior art. Also, the furnace does not have to be cooled down between batches, thereby saving time, energy, and wear and tear.

The present invention permits the heating of the investment material to occur at a nearly constant temperature, resulting in tremendous increases in productivity, energy savings and cost reductions.

DETAILED DESCRIPTION OF THE PREFERRED EMBODIMENTS

According to the present invention, a metal powder is added to the refractory powder. The metal powder may be composed of an elemental metal, or a metal alloy, or both. It is believed that the metal powder improves the thermal conductivity of the refractory material, thereby improving heat transfer within the mold. With better heat transfer, there is no longer a large temperature gradient through the mold, so the stresses which were caused by uneven heating of the mold are reduced, thus lowering the risk of explosive cracking or spalling. A mold made from this new refractory material can be inserted into a hot furnace, and the furnace temperature can be held constant throughout the heating process.

The metal powder in the refractory material reacts with oxygen in the air and is converted to metallic oxides during the heating process. Metallic oxides are commonly a part of filler systems, so the resulting material after heating is not appreciably different from prior art material. Since the metal completely oxidizes during heating, the resulting material is not reactive with the molten metal being poured into the mold.

The following examples illustrate some of the refractory material compositions which have been tested and demonstrate that the present compositions perform successfully without cracking when inserted into a hot furnace. Each of the first twenty-four examples, all containing some percentage of a metal powder, produced molds without explosive cracking. Example 25 is an example of a prior art formulation without metal powder which underwent explosive cracking during the heating process.

EXAMPLES

In all of the following examples, the compositions of the various substances in the refractory powder are given in terms of weight percentage. In all cases in which a metal powder is used, it is a 60 mesh size powder.

Example 1

The composition of the refractory material used was as follows:
Quartz Powder 37.50%
Cristobalite Powder 32.00%
Zircon Powder 5.00%
Zirconia Powder 1.00%
Ammonium Phosphate Powder 11.50%
Magnesium Oxide Powder 12.50%
Aluminum Metal Powder 0.50%

This refractory powder was mixed with a 35% colloidal silica solution, specifically Nalco 1035, to produce a slurry. The slurry was then poured into removable plastic rings, each containing a wax shape, and was then allowed to set in air at room temperature for one hour to produce molds. The molds were then placed into a hot furnace at 850° C. and were allowed to burn out for forty minutes. Upon introduction of the cold molds, the furnace lost heat until it reached a temperature of about 750° C., but returned to 850° C. within ten to fifteen minutes. The molds were removed from the furnace, and molten metal was cast into the molds. The molds were then allowed to cool at room temperature. There was no evidence of cracking or spalling of the molds.

Example 2

The composition of the refractory powder was changed from Example 1 by substituting 0.50% nickel metal powder in place of the 0.50% aluminum powder; the same procedure was then performed with this composition, and again no cracking or spalling occurred.

Example 3

The composition of the refractory powder was changed from Example 1 by using 0.50% copper powder in place of the 0.50% aluminum powder. Again, the same procedure as in Example 1 was performed using this composition, and again no cracking or spalling occurred.

Example 4

The composition of the refractory powder was changed from Example 1 by using 0.50% tin powder in place of the 0.50% aluminum powder. Again, the same procedure as in Example 1 was performed using this composition, and again no cracking or spalling occurred.

Example 5

The composition of the refractory powder was changed from Example 1 by using 0.50% brass powder in place of the 0.50% aluminum powder. Again, the same procedure as in Example 1 was performed using this composition, and again no cracking or spalling occurred.

Example 6

The composition of the refractory powder was changed from Example 1 by using 0.50% bronze powder in place of the 0.50% aluminum powder. Again, the same procedure as in Example 1 was performed using this composition, and again no cracking or spalling occurred.

Example 7

The composition of the refractory powder was changed from Example 1 by using 0.50% aluminum silicon alloy powder with low silicon content in place of the 0.50% aluminum powder. Again, the same procedure as in Example 1 was performed using this composition, and again no cracking or spalling occurred.

Example 8

The composition of the refractory powder was changed from Example 1 by using 0.50% aluminum silicon alloy powder with high silicon content in place of the 0.50% aluminum powder. Again, the same procedure as in Example 1 was performed using this composition, and again no cracking or spalling occurred.

Example 9

The composition of a different refractory powder used in this example was as follows:
Quartz Powder 37.75%
Cristobalite Powder 32.00%
Zircon Powder 5.00%
Zirconia Powder 1.00%
Ammonium Phosphate Powder 11.50%
Magnesium Oxide Powder 12.50%
Aluminum Metal Powder 0.25%

The same procedure as in Example 1 was performed using this composition of refractory powder, and no cracking or spalling occurred.

Example 10

The composition of the refractory powder used in Example 9 was changed by substituting 0.25% nickel powder for the 0.25% aluminum powder. The same procedure as in Example 1 was performed with this refractory material. Again, the results were successful, with no spalling or cracking seen.

Example 11

The composition of the refractory powder used in Example 9 was changed by substituting 0.25% copper powder for the 0.25% aluminum powder. The same procedure as in Example 1 was performed with this refractory material. Again, the results were successful, with no spalling or cracking seen.

Example 12

The composition of the refractory powder used in Example 9 was changed by substituting 0.25% tin powder for the 0.25% aluminum powder. The same procedure as in Example 1 was performed with this refractory material. Again, the results were successful, with no spalling or cracking seen.

Example 13

The composition of the refractory powder used in Example 9 was changed by substituting 0.25% brass powder for the 0.25% aluminum powder. The same procedure as in Example 1 was performed with this refractory material. Again, the results were successful, with no spalling or cracking seen.

Example 14

The composition of the refractory powder used in Example 9 was changed by substituting 0.25% bronze powder for the 0.25% aluminum powder. The same procedure as in Example 1 was performed with this refractory material. Again, the results were successful, with no spalling or cracking seen.

Example 15

The composition of the refractory powder used in Example 9 was changed by substituting 0.25% aluminum silicon alloy powder with low silicon content for the 0.25% aluminum powder. The same procedure as in Example 1 was performed with this refractory material. Again, the results were successful, with no spalling or cracking seen.

Example 16

The composition of the refractory powder used in Example 9 was changed by substituting 0.25% aluminum silicon alloy powder with high silicon content for the 0.25% aluminum powder. The same procedure as in Example 1 was performed with this refractory material. Again, the results were successful, with no spalling or cracking seen.

Example 17

The composition of a different refractory powder used in this example was as follows:
Quartz Powder 37.90%
Cristobalite Powder 32.00%
Zircon Powder 5.00%
Zirconia Powder 1.00%
Ammonium Phosphate Powder 11.50%
Magnesium Oxide Powder 12.50%
Aluminum Metal Powder 0.10%

The same procedure as in Example 1 was performed using this composition of refractory powder. Again, the results were successful, with no cracking or spalling seen.

Example 18

The composition of the refractory powder used in Example 17 was changed by substituting 0.10% nickel powder for the 0.10% aluminum powder of Example 17. The same procedure as in Example 1 was performed with this refractory material. Again, the results were successful, with no cracking or spalling seen.

Example 19

The composition of the refractory powder used in Example 17 was changed by substituting 0.10% copper powder for the 0.10% aluminum powder. The same procedure as in Example 1 was performed with this refractory material. Again, the results were successful, with no cracking or spalling seen.

Example 20

The composition of the refractory powder used in Example 17 was changed by substituting 0.10% tin powder for the 0.10% aluminum powder. The same procedure as in, Example 1 was performed with this refractory material. Again, the results were successful, with no cracking or spalling seen.

Example 21

The composition of the refractory powder used in Example 17 was changed by substituting 0.10% brass powder for the 0.10% aluminum powder. The same procedure as in Example 1 was performed with this refractory material. Again, the results were successful, with no cracking or spalling seen.

Example 22

The composition of the refractory powder used in Example 17 was changed by substituting 0.10% bronze powder for the 0.10% aluminum powder. The same procedure as in Example 1 was performed with this refractory material. Again, the results were successful, with no cracking or spalling seen.

Example 23

The composition of the refractory powder used in Example 17 was changed by substituting 0.10% aluminum silicon alloy powder with low silicon content for the 0.10% aluminum powder. The same procedure as in Example 1 was performed with this refractory material. Again, the results were successful, with no cracking or spalling seen.

Example 24

The composition of the refractory powder used in Example 17 was changed by substituting 0.10% aluminum silicon alloy powder with high silicon content for the 0.10% aluminum powder. The same procedure as in Example 1 was performed with this refractory material. Again, the results were successful, with no cracking or spalling seen.

Example 25

The composition of a different refractory powder used in this example was as follows:
Quartz Powder 38.00%
Cristobalite Powder 32.00%
Zircon Powder 5.00%

Zirconia Powder 1.00%
Ammonium Phosphate Powder 11.50%
Magnesium Oxide Powder 12.50%
Metal Powder 0.00%

Upon undergoing the same procedure as in Example 1, the molds made of this material experienced explosive cracking and spalling.

The present invention provides a material which permits substantial improvement in the prior art of casting methods. Since molds made using the present invention can be placed directly into a heated furnace, the processing time is greatly reduced. The processing time for the molds made using embodiments of the present invention was forty minutes, compared to the two to three hour process necessary when using prior art refractory materials. In addition to the time saved, the energy saved by being able to keep the furnace at a nearly constant temperature is enormous. As a side benefit, the useful lives of furnaces used in this process should be extended, since the structure of the furnace is not having to bear repeated expansion or contraction forces due to repeated changes in temperature.

Based on the tests that have been run, it is assumed that there are some other materials which have not yet been tested that would have similar properties to those materials that have been tested and that would therefore also be successful. The important properties appear to be that the material has good conductivity and that it completely oxidizes during the burn-out process. Examples of untested materials which appear to have the necessary properties are: vanadium, chromium, manganese, iron, cobalt, and zinc.

In light of the foregoing description of the invention and the previous examples, it should be appreciated by those skilled in the art that modifications may be made to the embodiments described above without departing from the spirit and scope of the invention as defined in the claims.

What is claimed is:

1. A powder refractory material, comprising:
   about 50 to 80 weight percent filler, comprising quartz powder and cristobalite powder;
   about 20 to 50 weight percent binder, comprising ammonium phosphate powder and magnesium oxide powder; and
   a metal powder.

2. A refractory material as recited in claim 1, wherein said metal powder is selected from the group consisting of: aluminum, vanadium, chromium, manganese, iron, cobalt, nickel, copper, zinc, tin, and their alloys.

3. A refractory material as recited in claim 1, wherein said metal powder is sized at approximately 60 mesh.

4. A refractory material as recited in claim 1, wherein the filler further contain zircon powder, and zirconia powder.

5. A refractory material as recited in claim 1, wherein the metal powder comprises aluminum.

6. A refractory material, comprising:
   about 50 to 80 weight percent filler, said filler including quartz powder, cristobalite powder, and zircon powder;
   about 20 to 50 weight percent binder, said binder including ammonium phosphate powder and magnesium oxide powder; and
   a metal powder.

7. A refractory powder as recited in claim 6, wherein the metal powder has a size of approximately 60 mesh.

8. A method for making a mold by use of a refractory powder, comprising the steps of:
   a. adding a metal powder to a refractory powder;
   b. adding a colloidal liquid to the refractory powder to produce a slurry;
   c. adding the slurry into a container having a wax shape therein and allowing the slurry to harden around said shape to produce a mold; and
   d. placing the mold into a hot furnace, and maintaining the temperature of the furnace substantially constant while the mold burns out.

9. A refractory powder as recited in claim 7, wherein the metal powder is aluminum.

10. A refractory powder as recited in claim 7, wherein the metal powder is 0.1 to 0.5 weight percent of the powder.

* * * * *